(12) United States Patent
Poi et al.

(10) Patent No.: US 8,229,090 B2
(45) Date of Patent: Jul. 24, 2012

(54) VOICE PORTAL COMMUNICATIONS

(75) Inventors: Parind S. Poi, Coppell, TX (US); Prashant B. Desai, Land O Lakes, FL (US); Mayuresh M. Hegde, Irving, TX (US); Juan M. Vasquez, Gibsonton, FL (US); Santosh M. Bijur, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1216 days.

(21) Appl. No.: 11/736,112

(22) Filed: Apr. 17, 2007

(65) Prior Publication Data

US 2008/0260137 A1 Oct. 23, 2008

(51) Int. Cl.
*H04M 11/00* (2006.01)

(52) U.S. Cl. ........... 379/88.18; 379/265.02; 379/265.13; 379/265.09; 379/266.04; 379/266.07; 379/211.02; 370/352

(58) Field of Classification Search .................. 379/67.5, 379/88.13, 88.18, 265.01, 265.02, 265.09, 379/265.13, 211.02, 266.04, 266.07; 370/352, 370/356

See application file for complete search history.

(56) References Cited

U.S. PATENT DOCUMENTS

| 2005/0069102 A1* | 3/2005 | Chang ........................ 379/88.18 |
| 2006/0109837 A1* | 5/2006 | Saha et al. .................... 370/352 |
| 2006/0256956 A1* | 11/2006 | Lee et al. ................. 379/266.01 |
| 2007/0070980 A1* | 3/2007 | Phelps et al. .................. 370/352 |
| 2007/0160188 A1* | 7/2007 | Sharpe et al. ............ 379/265.01 |

* cited by examiner

*Primary Examiner* — Antim Shah

(57) ABSTRACT

A method includes receiving a telephone call at a network device and forwarding the telephone call to a proxy device. The method also includes forwarding the telephone call, from the proxy device, to a first voice portal and determining that telephone call should be transferred to a second voice portal. The method further includes forwarding, by the first voice portal, a transfer request to the network device and forwarding, by the network device, the telephone call to a second voice portal.

18 Claims, 6 Drawing Sheets

VOICE PORTAL COMMUNICATIONS

BACKGROUND INFORMATION

Voice portals are frequently used to answer calls and obtain information from callers. For example, businesses often use voice portals that include interactive voice response (IVR) units to interact with callers and to obtain information from the callers. A voice portal may attempt to resolve a caller's inquiry or request without human intervention. Frequently, the voice portal obtains information and determines that human assistance is required. In these cases, the voice portal transfers the call to a human agent.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention. Instead, the scope of the invention is defined by the appended claims and their equivalents.

Implementations described herein relate to transferring calls and/or data associated with a call. In one implementation, a call may be transferred from a first voice portal to another voice portal using Internet protocol (IP) based signaling. In another implementation, data associated with a caller may be forwarded with the call to an appropriate agent.

Figure 1:
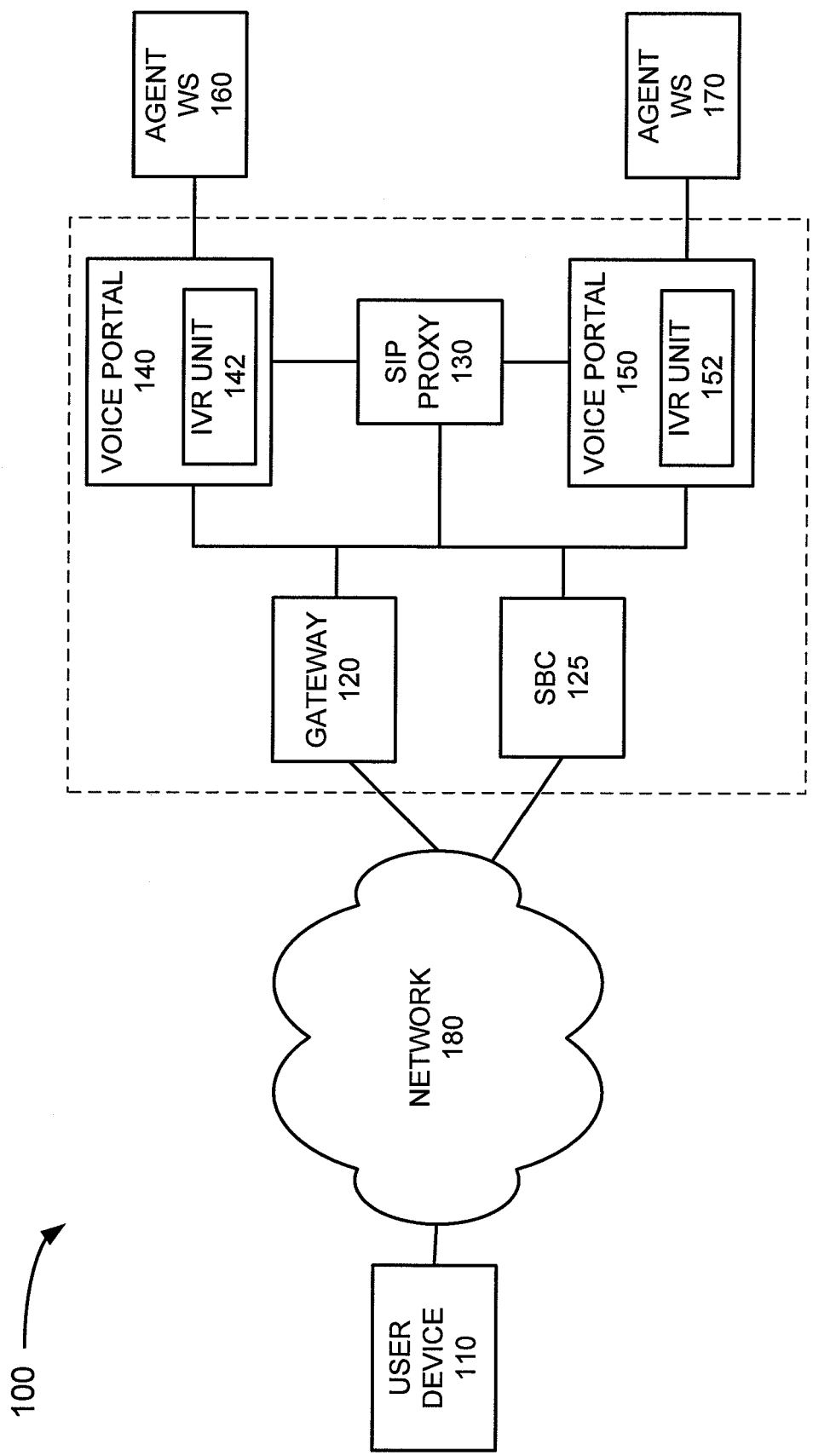
FIG. 1 illustrates an exemplary network in which systems and methods described herein may be implemented.

FIG. 1 is a block diagram of an exemplary network 100 in which systems and methods described herein may be implemented. Referring to FIG. 1, network 100 includes user device 110, gateway 120, session border controller (SBC) 125, session initiation protocol (SIP) proxy 130, voice portal 140, voice portal 150, agent workstation (WS) 160, agent WS 170 and network 180. The exemplary configuration illustrated in FIG. 1 is provided for simplicity. It should be understood that a typical network may include more or fewer devices than illustrated in FIG. 1. For example, additional user devices, switching devices, routing devices, etc., involved in routing calls and data may be included in network 100. In addition, additional voice portals and agent WSs may be included in network 100.

User device 110 may include any type of communication or computation device that is capable of transmitting and receiving voice signals and/or data to/from a network, such as network 180. For example, user device 110 may include any standard telephone, cordless telephone, cellular telephone, or other type of conventional telephone that interfaces with a public switched telephone network (PSTN) and/or wireless network to place and receive telephone calls. User device 110 may also include any client, such as a computer device, a web-based appliance, etc., that is configured to provide telephone functions using, for example, voice over Internet protocol (VoIP). For example, user device 110 may include a session initiation protocol (SIP)-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional personal computer (PC), laptop computer or other computing device.

Gateway 120 may include one or more devices that allow divergent transport networks to communicate and cooperatively carry traffic. For example, gateway 120 may provide for interoperation at two levels, e.g., between different signaling schemes and between different media forms. For example, gateway 120 may adapt between SS7 signaling of network 180 and session initiation protocol (SIP), H.323 protocols or other protocols (e.g., Internet protocols (IPs) or Internet based protocols) used by other devices in network 100. In one implementation, gateway 120 may convert time division multiplexed (TDM) encoded voice signals to a packetized data stream suitable for transport to and processing by SIP proxy 130.

Session border controller (SBC) 125 may include one or more SBCs that provide control of the boundary between different service provider networks, provide signaling protocol inter-working between an IP-based network and other service provider networks, control the transport boundary between service provider networks, and provide usage metering and Quality of Service (QoS) measurements for media flows. In one implementation, SBC 125 may correspond to an ingress point to SIP proxy 130. For example, SBC 125 may receive a VoIP call from user device 110 and forward the VoIP call to SIP proxy 130.

SIP proxy 130 may include a server/computing device that is able to receive data from gateway 120 and SBC 125 and forward the received data to an appropriate voice portal, such as one of voice portals 140 or 150, using SIP protocol. In other implementations, SIP proxy 130 may be able to receive and forward data via another protocol, such as H.323. In an exemplary implementation, SIP proxy 130 may also function to balance the load associated with a large number of calls among a number of voice portals.

Voice portal 140 may represent a front end device associated with a call center. In an exemplary implementation, voice portal 140 may include interactive voice response (IVR) unit 142 that interacts with callers to obtain information associated with the call. For example, IVR unit 142 may include speech software/hardware that provides voice commands to a caller to obtain information. IVR unit 142 may also include speech recognition software that receives voice responses from the caller and identifies what the caller has voiced. If necessary (e.g., the call cannot be handled without human intervention), voice portal 140 may forward the call to an appropriate agent WS, such as agent WS 160. Voice portal 140 may also include an automatic call distributor (ACD) or interface with an ACD (not shown) that distributes calls among a number of agent workstations, such as agent WS 160 and other agent WSs (not shown).

Voice portal 150 may include IVR unit 152 and may represent a front end associated with a different call center than voice portal 140. For example, voice portal 140 may represent the front end of a call center associated with retail related service issues, such as billing, ordering new telephone, television and/or Internet service, ordering new telephone, television and/or Internet related features for an existing service, etc. Voice portal 150 may represent the front end of a call center associated with repair related service issues, such as reporting telephone, television and/or Internet related problems, telephone/fiber optic line related problems, etc. Voice portal 150 may also include an ACD or interface with an ACD (not shown) that distributes calls among a number of agent workstations, such as agent WS 170 and other agent WSs (not shown).

Agent WSs 160 and 170 may represent any conventional workstation/computer and operator used to handle calls from callers that require human intervention. In an exemplary implementation, agent WS 160 may be associated with voice portal 140 and agent WS 170 may be associated with voice portal 150. In addition, in exemplary implementation, agent WSs 160 and 170 may be connected to voice portals 140 and 150 via a network, such as network 180. In alternative implementations, agent WSs 160 and 170 may be connected directly to the voice portals, connected via a LAN, connected via a private network, etc.

Agent WSs 160 and 170 may include a workstation or computer, such as a personal computer or laptop. Agent WSs 160 and 170 may also include any device capable of performing IP based messaging, such as VoIP, to transmit voice and/or text. Agent WSs 160 and 170 may also include any conventional telephone (not shown) to place and receive telephone calls. For example, the telephone device may be a standard telephone, a cordless telephone, a cellular telephone or any other type of conventional telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, be a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device.

Network 180 may include one or more wired and/or wireless networks that are capable of receiving and transmitting data and voice signals. For example, network 180 may include one or more public switched telephone networks (PSTNs) or other type of switched network. Network 180 may also include one or more wireless networks and may include a number of transmission towers for receiving wireless signals and forwarding the wireless signals toward the intended destination. Network 180 may further include one or more packet switched networks, such as an Internet protocol (IP) based network, a local area network (LAN), a wide area network (WAN), an intranet, the Internet, or another type of network that is capable of transmitting telecommunications traffic (e.g., VoIP traffic). For example, network 180 may include one or more SIP-based networks, one or more H.323/H.225-based networks, or any other type of packet switched network that is capable of transmitting traffic from a source device to a destination device.

The components illustrated within the dotted box in FIG. 1 (i.e., gateway 120, SBC 125, SIP proxy 130, voice portal 140 and voice portal 150) may be located within the same data center. Various functions are described below as being performed by particular components in network 100. In other implementations, various functions described as being performed by one device may be performed by another device or various functions described as being performed by multiple devices may be combined and performed by a single device.

Figure 2:
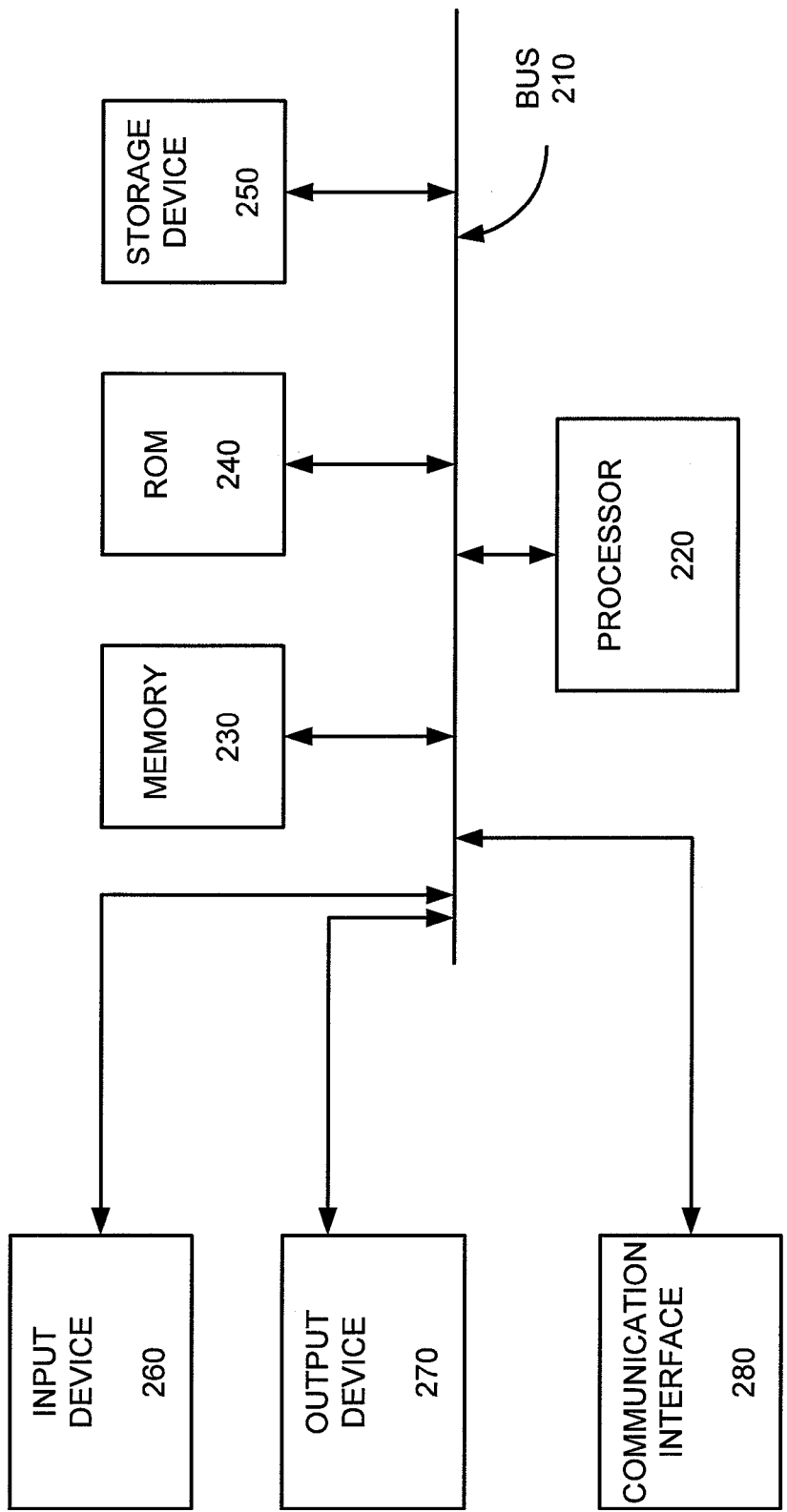
FIG. 2 illustrates an exemplary configuration of the session initiation protocol proxy and other components in the network of FIG. 1.

FIG. 2 illustrates an exemplary configuration of SIP proxy 130. Gateway 120, SBC 125 and voice portals 140 and 150 may each be configured in a similar manner. Referring to FIG. 2, SIP proxy 130 may include bus 210, processor 220, main memory 230, read only memory (ROM) 240, storage device 250, input device 260, output device 270, and communication interface 280. Bus 210 may include a path that permits communication among the elements of SIP proxy 130.

Processor 220 may include a processor, microprocessor, or processing logic that may interpret and execute instructions. Memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to SIP proxy 130, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that SIP proxy 130 uses to communicate with other devices and/or systems. For example, communication interface 280 may include a modem or an Ethernet interface to a LAN. Alternatively, communication interface 280 may include other mechanisms for communicating via a network, such as network 180.

SIP proxy 130, gateway 120, SBC 125 and voice portals 140 and 150 may perform processing associated with processing calls and/or data in network 100. According to an exemplary implementation, SIP proxy 130, gateway 120, SBC 125 and voice portals 140 and 150 may perform these operations in response to their respective processors 220 executing sequences of instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hard-wired circuitry may be used in place of or in combination with software instructions to implement processes consistent with the principles of the invention. Thus, implementations described herein are not limited to any specific combination of hardware circuitry and software.

Figure 3:
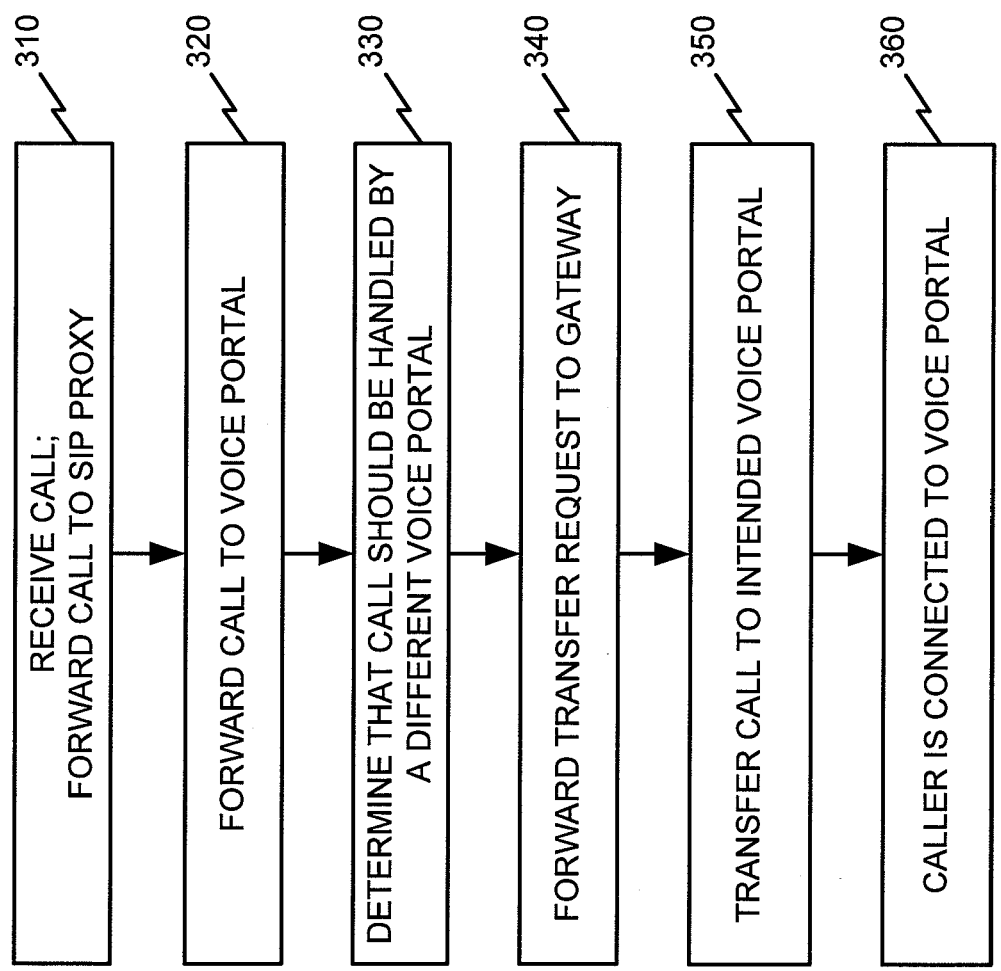
FIG. 3 is a flow diagram illustrating exemplary processing by components of the network of FIG. 1.

FIG. 3 is a flow diagram illustrating exemplary processing associated with processing calls in network 100. Processing may begin when a caller at user device 110 places a call to one of voice portals 140 and 150. For example, assume that user device 110 is a conventional plain old telephone system (POTS) phone and the caller enters a telephone number associated with voice portal 140 via user device 110. The call may be routed via network 180 to gateway 120.

Gateway 120 may receive the call and determine that the call is intended for voice portal 140 (act 310). Gateway 120 may also convert the incoming call into an IP format and forward the call to SIP proxy 130 (act 310). For example, gateway 120 may receive the call via a digital signal 0 (DS0)

channel in a TDM format and convert the incoming call into a packet based format, such as a SIP format, for processing by SIP proxy 130.

SIP proxy 130, as discussed above, may perform load balancing among a number of voice portals. For example, SIP proxy 130 may use a dialed number identification service (DNIS) to identify the telephone number that the caller at user device 110 dialed. The identified telephone number may be a number associated with a voice portal that handles retail related telephone/television/Internet issues. In addition, a number of voice portals may be configured to handle such calls/issues. In this case, SIP proxy 130 may determine that the call is to be forwarded to voice portal 140 based on the current call processing load of voice portal 140 and other voice portals (not shown) that handle retail related issues. SIP proxy 130 may then route the call to voice portal 140 (act 320).

IVR unit 142 at voice portal 140 may answer the call to establish communications with the caller at user device 110. IVR unit 142 may then interact with the caller to determine how to assist the caller. For example, as discussed above, assume that voice portal 140 is associated with the front end of a call center designed to handle retail related issues, such as billing related issues, ordering new features/service, etc. After interacting with the caller, IVR unit 142 may determine that the caller at user device 110 is actually interested in reporting telephone service related problems, which is handled by a different voice portal (act 330). For example, as discussed above, assume that voice portal 150 is associated with handling service related problems.

In this case, voice portal 140 generates a transfer request message identifying that the call should be forwarded to voice portal 150. Voice portal 140 may then forward the transfer request message to gateway 120 (act 340). The transfer request message may be a SIP Refer message identifying the intended destination for the call. Gateway 120 may receive the transfer request message and determine that the intended destination for the call is an internal destination. That is, gateway 120 may determine that the destination voice portal 150 is located in the same data center as gateway 120. In this case, gateway 120 generates and forwards a message to SIP proxy 130 identifying the intended destination. This message may be a SIP Invite message that identifies the destination voice portal (i.e., voice portal 150 in this example).

SIP proxy 130 may receive the message, identify that the intended destination is voice portal 150 and forward the call to voice portal 150 (act 350). The call may then be connected between the caller at user device 110 and IVR 152 at voice portal 150. That is, the call set up between gateway 120 to voice portal 150 may be completed and the caller at user device 110 may proceed to interact with IVR unit 152 at voice portal 150 (act 360).

In this manner, calls may be re-routed within a data center without having the call exit the data center and be re-routed via an external network, such as the PSTN. That is, a call that is more appropriately handled at a voice portal other than the voice portal at which the call is initially received may be re-routed using, for example, a VoIP transfer without having the call exit the data center. This may save considerable processing time and resources as compared to having the call exit the data center and be re-routed via an external network, such as network 180.

In other implementations, the voice portal to which the call is transferred may be located externally from the data center that originally received the call. For example, assume that voice portal 150 is located externally from the data center that includes gateway 120, SIP proxy 130 and voice portal 140. In this case, gateway 120 may forward the call via, for example, a SIP Invite message to an appropriate SIP proxy associated with the destination voice portal. The receiving SIP proxy may then forward a SIP Invite message to voice portal 150 so that the call may be set up to voice portal 150. In this case, the call may be re-rerouted using IP signaling (e.g., SIP signaling) without the call having to be re-routed using an external switched network, such as the PSTN.

Figure 4:
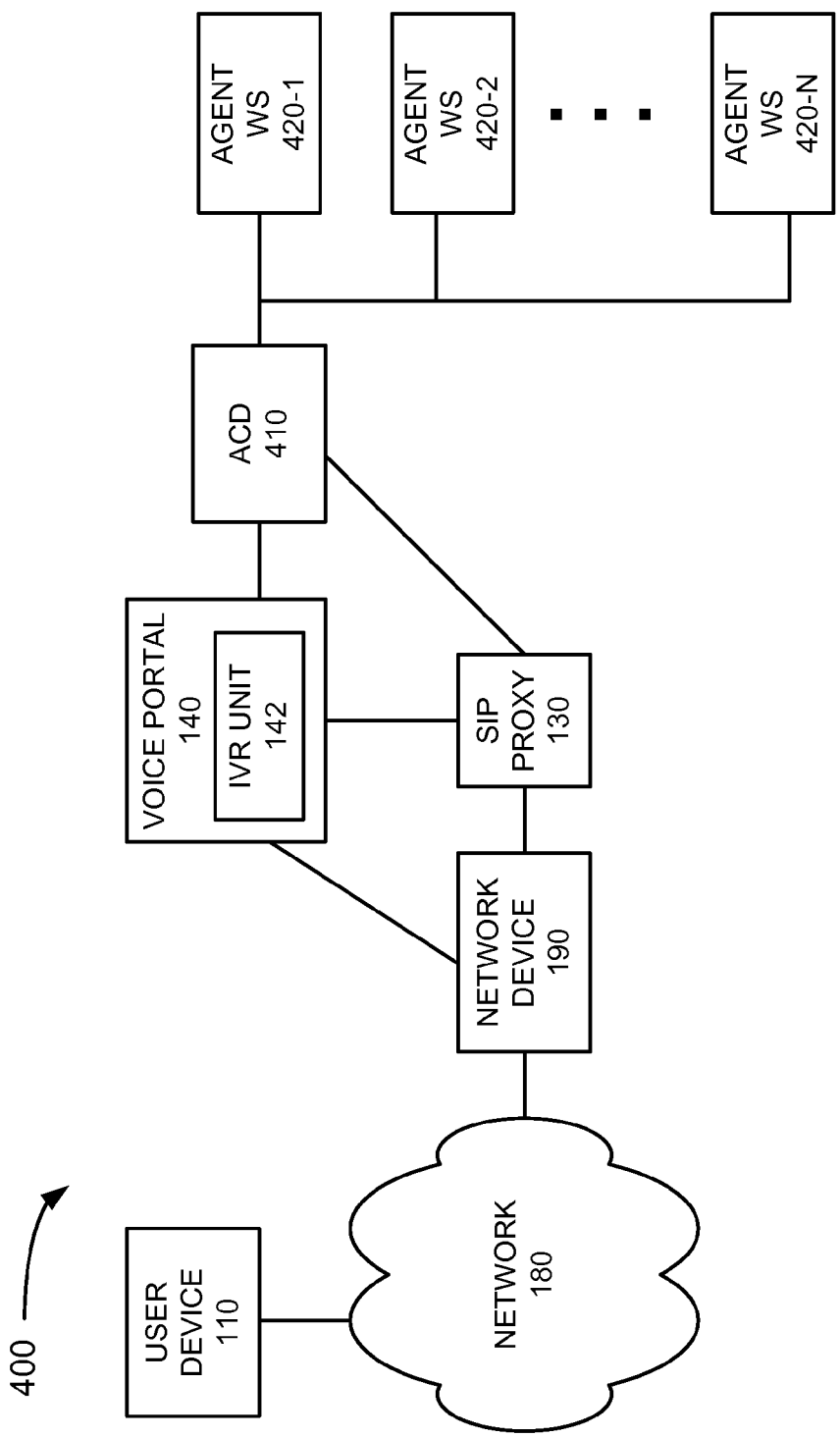
FIG. 4 illustrates an exemplary network in which systems and methods described herein may be implemented.

In some instances, the particular IVR unit (e.g., IVR unit 142 or 152) may not be able to resolve the caller's request/inquiry without human intervention. In this case, IVR unit 142 or IVR unit 152 may forward the call to an ACD that then forwards the call to appropriate agent WS, such as one of agent WSs 160 or 170. In this case, caller related data may be forwarded to one of the agent WSs using, for example, IP signaling, as described in detail below. [0035] FIG. 4 illustrates an exemplary network 400 in which caller related data may be forwarded to an agent workstation. Referring to FIG. 4, network 400 includes user device 110, SIP proxy 130, voice portal 140, IVR unit 142 and network 180. User device 110, SIP proxy 130, voice portal 140, IVR unit 142 and network 180 may process calls in a manner similar to that described above with respect to FIG. 1. Network 400 may also include network device 190, automatic call distributor (ACD) 410 and agent WSs 420-1 through 420-N, collectively referred to as agent WSs 420.

Network device 190 may include a gateway that functions similar to gateway 120 described above. Network device 190 may also or alternatively include an SBC that functions similar to SBC 125 described above.

ACD 410 may distribute calls received at voice portal 140 to one of agents WSs 420-1 through 420-N. ACD 410 is illustrated as being located externally from voice portal 140. In some implementations, ACD 410 may be part of voice portal 140. In each case, ACD 410 may forward calls to an available one of the agent WSs 420.

Agent WSs 420 may be similar to agents WSs 160 and 170 described above. That is, each of agent WSs 420 may include a workstation or computer, such as a personal computer or laptop. Agent WSs 420 may also include any device capable of performing IP based messaging, such as VoIP, to transmit voice and/or text. Agent WSs 420 may also include a standard telephone, a cordless telephone, a cellular telephone or any other type of conventional telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, be a SIP-based telephone device.

In an exemplary implementation, voice portal 140 may identify caller related data associated with a received call. Voice portal 140 and/or ACD 410 may then forward this caller related data to one of WSs 420 via, for example, SIP signaling, as described in detail below. This information may then be forwarded to one of agent WSs 420.

Figure 5:
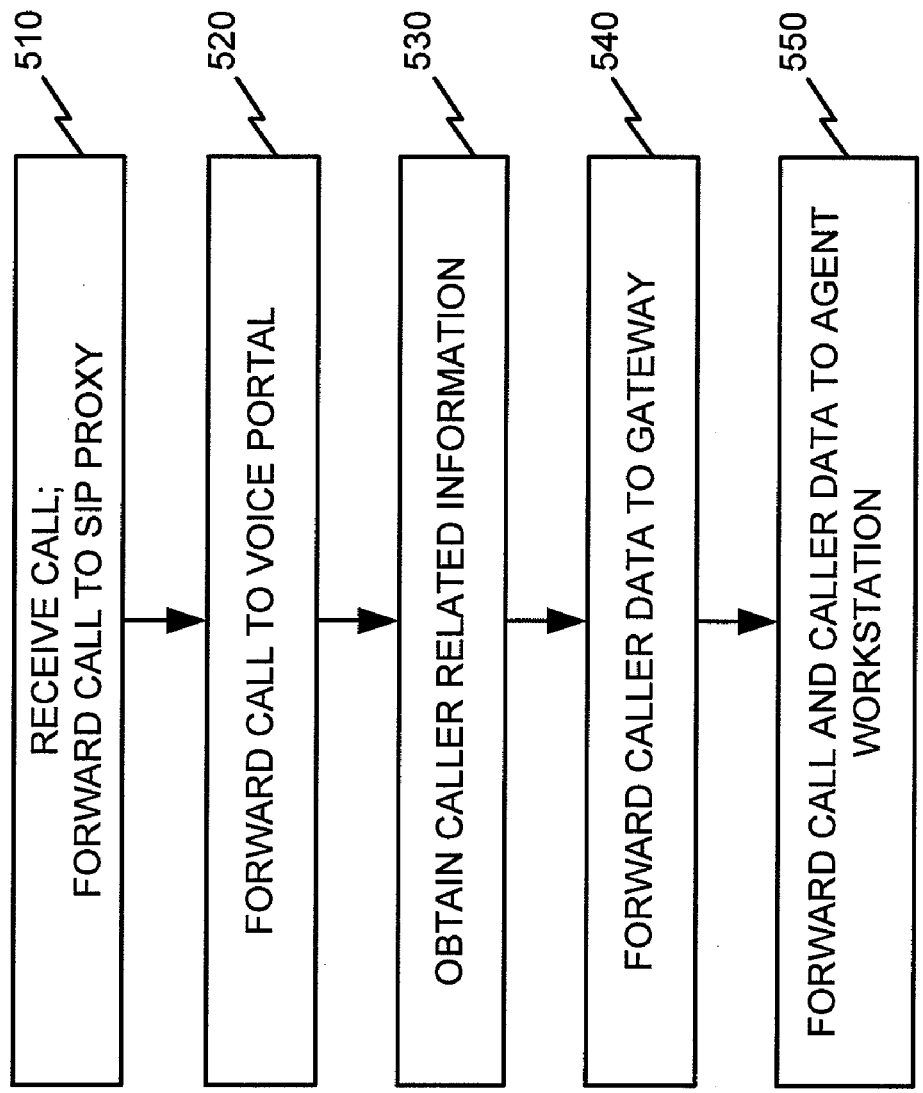
FIG. 5 is a flow diagram illustrating exemplary processing by components of the network of FIG. 4.

FIG. 5 is a flow diagram illustrating exemplary processing associated with forwarding caller related data in network 400. Processing may begin with a caller at user device placing a call to voice portal 140. The call may be routed via network 180 to network device 190 in a manner similar to that described above with respect to FIG. 3. Network device 190 may receive the call (510). In some instances, such as in situations where user device 110 is a POTS phone, network device 190 may convert the call into a packet switching compatible protocol, such as an IP protocol. In other instances, such as in situations where user device 110 is a SIP telephone, network device 190 may not have to convert the call into a packet switching protocol. In either case, network device 190 may generate a SIP Invite message and forward the SIP Invite message to SIP proxy 130 (act 510). SIP proxy 130 may receive the SIP Invite message, identify voice portal 140 as the destination and forward the SIP Invite message to voice portal 140 (act 520). Voice portal 140 may receive the SIP Invite message and respond with a SIP OK acknowledgement message. IVR unit 142 may then obtain information associated with the caller (act 530).

For example, IVR unit 142 may use the caller's telephone number to retrieve information stored in a database (not shown) associated with the caller. The database may include information associated with a large number of subscribers to various services provided to callers, such as the caller at user device 110. This information may include the caller's name, the caller's address, recent billing information, etc. IVR unit 142 may also obtain and/or retrieve additional information via questions provided to the caller. That is, IVR unit 142 may query the caller as to the nature of the call and use, for example, speech recognition software to identify the caller's response(s). This information may be temporarily stored at IVR unit 142.

IVR unit 142 may then generate a message with the acquired caller data and forward the message to network device 190 (act 540). In an exemplary implementation, the message may be a SIP Refer message that includes the caller data. Network device 190 may receive the SIP Refer message with the caller data and generate a SIP Invite message that includes the caller data. Network device 190 may forward the SIP Invite message to ACD 410. ACD 410 may receive the SIP Invite message and respond to SIP proxy 130 with a SIP OK message. SIP proxy 130 may receive the SIP OK message from ACD 410 and forward the SIP OK message to network device 190.

ACD 410 may also forward the call and the caller data to one of agent WSs 420 (act 550). For example, assume that ACD 410 identifies agent WS 420-1 as being an available agent WS. ACD 410 may forward the call to agent WS 420-1. In an exemplary implementation, ACD 410 may forward the SIP Invite message and the caller data to agent WS 420-1. That is, ACD 410 may forward the SIP Invite message to a telephone device associated with WS 420-1. ACD 410 may also forward the caller data to agent WS 420-1. In an exemplary implementation, the caller data may be forwarded via SIP signaling. The caller data may then appear at agent WS 420-1 as a screen pop on a computer or display included in agent WS 420-1. In other words, the caller data may be automatically displayed via an output screen of agent WS 420-1. In addition, when the SIP OK message is received at network device 190, the voice connection may be established between agent WS 420-1 and the caller at user device 110 so that the caller at user device 110 and an agent at agent WS 420-1 may commence with the telephone call.

In this manner, agent WSs 420 receive caller data via, for example, a SIP signaling message. This enables the operator at the agent WSs to be able to immediately aid the caller and not query for various caller related information that may already by obtained.

Figure 6:
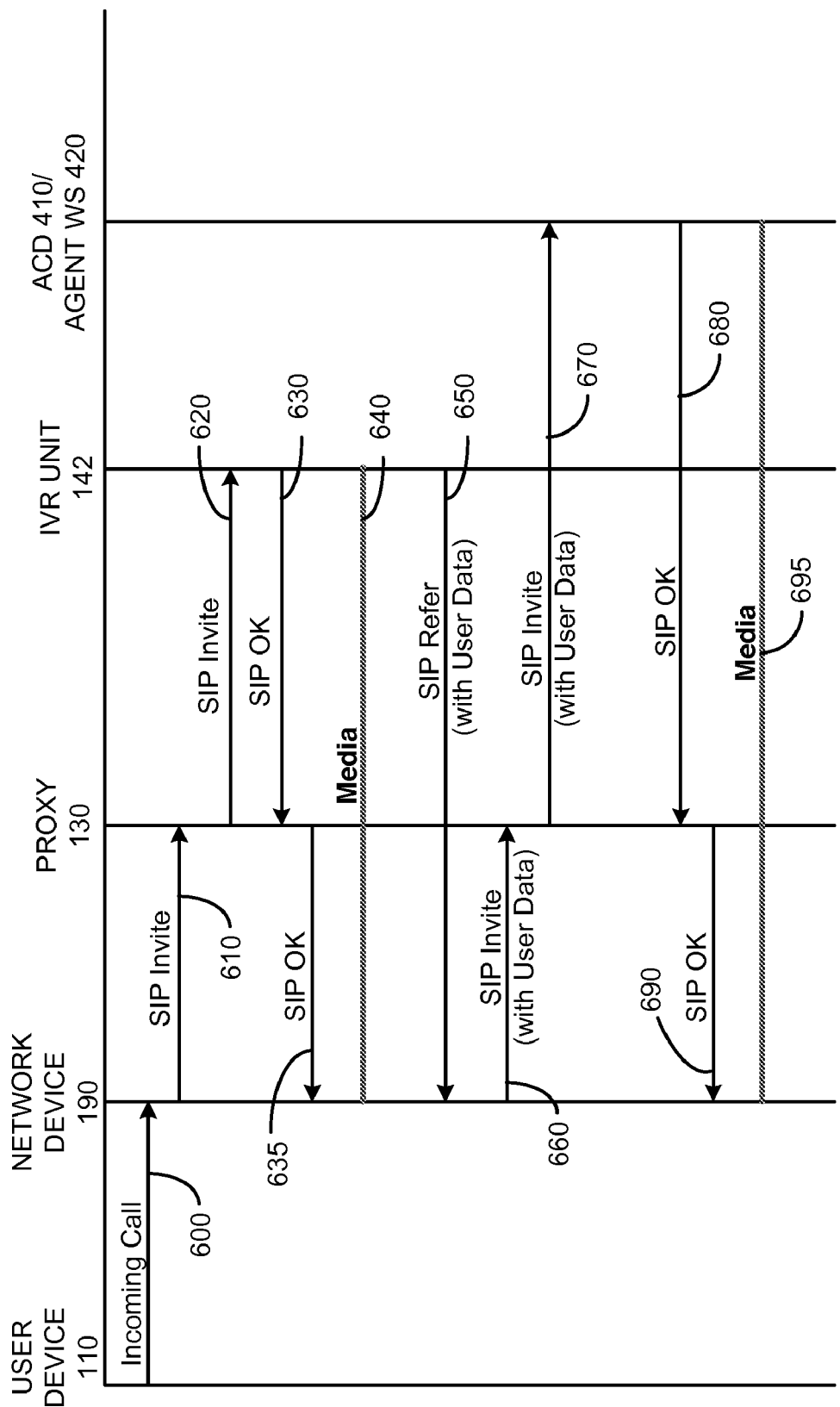
FIG. 6 is a call flow diagram associated with the processing illustrated in FIG. 5.

FIG. 6 is a call flow diagram schematically illustrating one exemplary sequence of interactions between a caller at user device 110 and other components of network 400 consistent with the processing described above with respect to FIG. 5. Initially, the caller at user device 110 places a call that is forwarded to network device 190 (interaction 600). Network device 190 generates and forwards a SIP Invite message to SIP proxy 130 (interaction 610), which forwards the SIP Invite message to IVR unit 142 (interaction 620). IVR unit 142 generates a SIP OK message and forwards the SIP OK message to SIP proxy 130 (interaction 630). SIP proxy 130 may forward the SIP OK message to network device 190 (interaction 635).

A media connection is then established between the caller at user device 110 and IVR unit 142 (interaction 640). IVR unit 142 may then obtain user/caller data via interaction with the caller at user device 110. IVR unit 142 may then generate a SIP Refer message with some or all of the user/caller data and forward the SIP refer message to network device 190 (interaction 650).

Network device 190 may then generate and forward a SIP Invite message with the user/caller data and forward the SIP Invite message to SIP proxy 130 (interaction 660). SIP proxy 130 may forward the SIP Invite message with some or all of the user/caller data to ACD 410 and/or an agent workstation (interaction 670). ACD 410 and/or agent WS 420 may forward a SIP OK message in response to the SIP Invite message and forward the SIP OK message to SIP proxy 130 (interaction 680). SIP proxy 130 may forward the SIP OK message to network device 190 (interaction 690). The caller at user device 110 and the agent at WS 420 may then communicate via a multi-media connection (interaction 695).

Implementations described herein provide for transferring calls among voice portals. In addition, caller data may be provided along with a call using various IP-based signaling. This allows for efficient handling of calls in a data center environment.

The foregoing description of exemplary implementations provides illustration and description, but is not intended to be exhaustive or to limit the invention to the precise form disclosed. Modifications and variations are possible in light of the above teachings or may be acquired from practice of the invention.

For example, various features have been described above with respect to using SIP signaling. As discussed above, other signaling protocols, such as H.323 or other IP-based signaling/protocols may be used in other implementations. In addition, in some implementations, the functions described above as being performed by one of the components may be performed by other components. In other implementations, the functions described as being performed by multiple components may be performed by a single component. For example, in some implementations, the functions described as being performed by gateway 120 (or SBC 125) and SIP proxy 130 may be performed by a single device. In addition, in some implementations, a SIP proxy may not be required.

For example, in some implementations, a soft switch may be used instead of SIP proxy 130. In still other implementations, a combination of SIP proxies and soft switches may be used to process and forward telephone calls.

Further, in some implementations, the intra-data center transfer (or inter-data center transfer) described above with respect to FIG. 3 may be combined with the transfer of caller related data associated with FIG. 5. For example, caller information may be obtained by IVR unit 142 as described above with respect to FIG. 5 prior to determining that the call should be handled by another voice portal. In this case, the caller related data may be obtained and transferred with the transferred call to another voice portal, such as voice portal 150.

In other instances, if the first voice portal that receives the call (e.g., voice portal 140) determines that it is not the appropriate voice portal to handle the call, but cannot identify the proper voice portal, the first voice portal may transfer the call to gateway 120 (or SBC 125, network device 190 or SIP proxy 130) with all or some of the caller related data obtained during interaction with the caller. In this case, gateway 120 (or SBC 125 or network device 190) and/or SIP proxy 130 may use some or all of the obtained caller related data received from the first voice portal (e.g., voice portal 140 in this example) to identify another voice portal (e.g., voice portal 150) that is the appropriate voice portal to handle the call.

In addition, while series of acts have been described with respect to FIGS. 3 and 5, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting of the invention. Thus, the operation and behavior of the aspects of the invention were described without reference to the specific software code—it being understood that one would be able to design software and control hardware to implement the various features based on the description herein.

Further, certain portions of the invention may be implemented as "logic" that performs one or more functions. This logic may include hardware, such as a processor, a microprocessor, an application specific integrated circuit, or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, at a network device, a telephone call from a caller;
   forwarding the telephone call to a proxy device;
   forwarding the telephone call, from the proxy device, to a first voice portal via session initiation protocol (SIP) signaling;
   determining that the telephone call should be transferred to a second voice portal, wherein the determining that the telephone call should be transferred to a second voice portal comprises:
      communicating with the caller via an interactive voice response unit,
      identifying, by the interactive voice response unit, information including a nature of the telephone call, and
      determining, by the interactive voice response unit, that the first voice portal is not an appropriate voice portal to service the telephone call based on the identified information;
   forwarding, by the first voice portal and in response to determining that the first voice portal is not the appropriate voice portal to service the telephone call, a transfer request to the network device using a SIP refer message; and
   forwarding, by the network device, the telephone call and the identified information to the second voice portal via SIP signaling.

2. The method of claim 1, wherein the first and second voice portals are located in a same data center and the forwarding the telephone call to the second voice portal comprises:
   forwarding the telephone call to the second voice portal without transferring the telephone call outside the same data center.

3. The method of claim 1, further comprising:
   converting, by the network device, the telephone call into a session initiation protocol or an H.323 protocol telephone call.

4. The method of claim 1, further comprising:
   identifying caller related data associated with the telephone call; and
   forwarding the caller related data with the telephone call to the second voice portal via SIP signaling.

5. A method, comprising:
   receiving, at a gateway, a telephone call from a caller;
   forwarding the telephone call to an interactive voice response (IVR) unit, wherein the forwarding comprises:
      generating, by the gateway, a session initiation protocol (SIP) invite message,
      forwarding, by the gateway, the SIP invite message to a proxy device, and
      forwarding, by the proxy device, the SIP invite message to the IVR unit;
   obtaining caller related data, by the IVR unit, based on interaction with the caller, wherein the caller related data includes information identifying a reason for the telephone call and at least one of a name associated with the caller or an address associated with the caller;
   forwarding, by the IVR unit, the caller related data to the gateway using a SIP refer message; and
   forwarding the telephone call and the caller related data using Internet protocol compatible signaling to an automatic call distributor (ACD) or to an agent workstation,
   wherein the IVR unit is associated with a first voice portal, the method further comprising:
   determining, by the IVR unit, that the first voice portal is not an appropriate voice portal to service the telephone call based on the identified reason for the telephone call; and
   forwarding the telephone call and the caller related data to a second IVR unit associated with a second voice portal when it is determined that the first voice portal is not the appropriate voice portal to service the telephone call and prior to forwarding the telephone call and the caller related data to an ACD or to an agent workstation.

6. The method of claim 5, wherein the forwarding the telephone call and the caller related data comprises forwarding the telephone call and the caller related data to the ACD using session initiation protocol (SIP) signaling.

7. The method of claim 6, further comprising:
   forwarding, by the ACD, the telephone call and the caller related data to the agent workstation.

8. The method of claim 5, wherein the forwarding the telephone call and the caller related data comprises forwarding the telephone call and the caller related data using H.323 signaling.

9. The method of claim 5, wherein the caller related data comprises:
   the name associated with the caller and the address associated with the caller.

10. The method of claim 5, wherein the forwarding the telephone call and the caller related data to an ACD or to an agent workstation comprises:
   forwarding, by the gateway, a SIP invite message with the caller related data to the proxy device, and forwarding, by the proxy device, the SIP invite message with the caller related data.

11. A system, comprising:
   a network device configured to:
      receive a telephone call from a caller, and
      generate a session initiation protocol (SIP) invite message associated with the telephone call;
   a proxy device configured to:
      receive the SIP invite message from the network device, and
      forward the SIP invite message; and
   a first voice portal configured to:
      receive the forwarded SIP invite message from the proxy device,
      obtain information, via the telephone call, identifying a reason for the telephone call,
      determine, based on the identified reason for the telephone call, that the first voice portal cannot service the telephone call, and
      forward a SIP refer message to the network device, in response to determining that the first voice portal cannot service the telephone call, wherein the network device is further configured to:
         identify a second voice portal to service the telephone call, and
         forward the telephone call and the obtained information to the second voice portal via SIP signaling.

12. The system of claim 11, further comprising:
   the second voice portal, wherein the first and second voice portals are located in a first data center and the network device forwards the telephone call to the second voice portal without the telephone call exiting the first data center.

13. The system of claim 11,
   wherein the transfer message includes at least some of the obtained information, wherein the network device is further configured to:
   identify the second voice portal based on the information identifying the reason for the telephone call.

14. The system of claim 11, wherein the network device is further configured to:
   convert the telephone call into a SIP format.

15. A system, comprising:
   a network device configured to:
      receive a telephone call from a caller,
      generate a session initiation protocol (SIP) invite message associated with the telephone call, and
      forward the SIP invite message;
   a proxy device configured to:
      receive the SIP invite message from the network device, and
      forward the SIP invite message; and
   a first voice portal configured to:
      receive the forwarded SIP invite message from the proxy device,
      obtain caller related data based on interaction with the caller via an interactive voice response (IVR) unit,
      determine that the first voice portal is not an appropriate voice portal to service the telephone call based on the interaction with the caller, and
      forward at least some of the caller related data to the network device via a SIP refer message in response to determining that the first voice portal is not the appropriate voice portal to service the telephone call,
   wherein the network device is further configured to:
      receive the forwarded caller related data, and
      forward the telephone call and the caller related data using a SIP invite message to an automatic call distributor.

16. The system of claim 15, further comprising:
   the automatic call distributor (ACD), wherein when forwarding the telephone call and the caller related data, the network device is configured to forward the telephone call and the caller related data to the proxy device, and wherein the proxy device is further configured to forward the telephone call and the caller related data to the ACD.

17. The system of claim 15, wherein the network device is further configured to convert the telephone call into a SIP format.

18. The system of claim 15, wherein the caller related data comprises information identifying a reason for the telephone call and when forwarding the telephone call and the caller related data using a SIP invite message to an automatic call distributor, network device is configured to:
   forward the information identifying the reason for the telephone call.

* * * * *